United States Patent
Liu et al.

(10) Patent No.: US 10,075,238 B2
(45) Date of Patent: Sep. 11, 2018

(54) METHODS AND DEVICES FOR OPTICAL SIGNAL ENCODING AND DECODING

(71) Applicant: KUANG-CHI INTELLIGENT PHOTONIC TECHNOLOGY LTD., Shenzhen (CN)

(72) Inventors: Ruopeng Liu, Shenzhen (CN); Xudong Wang, Shenzhen (CN); Weicheng Xu, Shenzhen (CN); Linyong Fan, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/449,973

(22) Filed: Mar. 5, 2017

(65) Prior Publication Data

US 2017/0187457 A1 Jun. 29, 2017

Related U.S. Application Data

(63) Continuation of application No. PCT/CN2015/086826, filed on Aug. 13, 2015.

(30) Foreign Application Priority Data

Sep. 5, 2014 (CN) .......................... 2014 1 0452192
Sep. 5, 2014 (CN) .......................... 2014 1 0454019

(51) Int. Cl.
*H04B 10/00* (2013.01)
*H04B 10/116* (2013.01)
(Continued)

(52) U.S. Cl.
CPC ......... *H04B 10/116* (2013.01); *H04B 10/114* (2013.01); *H04B 10/524* (2013.01); *H04L 25/4902* (2013.01)

(58) Field of Classification Search
CPC .................................................... H04B 10/116
(Continued)

(56) References Cited

U.S. PATENT DOCUMENTS 8,253,353 B2 * 8/2012 Baggen ............... H04B 10/1141
315/247
2007/0092264 A1 * 4/2007 Suzuki ............... H04B 10/1141
398/189
(Continued)

FOREIGN PATENT DOCUMENTS

CN 103546213 A 1/2014
CN 103812557 A 5/2014
(Continued)

*Primary Examiner* — Juan A Torres
(74) *Attorney, Agent, or Firm* — Perkins Coie LLP

(57) ABSTRACT

The present disclosure discloses methods and devices for an optical signal encoding and decoding. The optical signal encoding method includes: reading N-ary data bit by bit, and encoding the data into electric signal units: encoding each different digit in the N-ary data into a different electric signal unit, where high level duration and low level duration in the electric signal unit are Ti1, Ti2, . . . , and Tij respectively, i, j, and N are natural numbers, and the different electric signal units are separated by delimiters; and combining the electric signal units corresponding to the N-ary data into a drive signal, where the drive signal is used for being output in a light form. Instable flashing of emitted light of a terminal device is overcome effectively, and information transmission reliability is further improved.

18 Claims, 5 Drawing Sheets

When an electric signal unit is detected, detect and record high and low level duration Ti1, Ti2..., and Tij in the electric signal unit — S141

Calculate a calculated value between Ti2, Ti3..., and Tij and Ti1, and according to the calculated value, convert the electric signal unit into a digit corresponding to the N-ary data — S142

(51) Int. Cl.
*H04B 10/114* (2013.01)
*H04B 10/524* (2013.01)
*H04L 25/49* (2006.01)

(58) Field of Classification Search
USPC .......................................................... 398/115
See application file for complete search history.

(56) References Cited

U.S. PATENT DOCUMENTS

| | | | |
|---|---|---|---|
| 2008/0310861 A1* | 12/2008 | Wong | H03K 5/084 |
| | | | 398/210 |
| 2009/0208221 A1* | 8/2009 | Sasai | H04B 1/707 |
| | | | 398/130 |
| 2011/0001531 A1* | 1/2011 | Nishi | H03L 7/0807 |
| | | | 327/162 |
| 2012/0099857 A1* | 4/2012 | Zhang | H04B 10/07955 |
| | | | 398/38 |
| 2012/0105266 A1* | 5/2012 | Schenk | H05B 37/0272 |
| | | | 341/191 |
| 2015/0063823 A1* | 3/2015 | Eiselt | H04B 10/07953 |
| | | | 398/140 |

FOREIGN PATENT DOCUMENTS

| | | |
|---|---|---|
| CN | 103812559 A | 5/2014 |
| WO | 2013001408 A | 1/2013 |

\* cited by examiner

METHODS AND DEVICES FOR OPTICAL SIGNAL ENCODING AND DECODING

CROSS REFERENCE TO RELATED APPLICATIONS

This application is a continuation of PCT Application No. PCT/CN2015/086826 filed on Aug. 13, 2015, which claims priority to Chinese Patent Application No. 201410454019.3 of Sep. 5, 2014 and Chinese Patent Application No. 201410452192.X of Sep. 5, 2014, all of which are incorporated herein by reference.

TECHNICAL FIELD

The present disclosure relates to the field of visible light communications, and in particular, to methods and devices for optical signal encoding and decoding.

BACKGROUND

A wireless light communications technology is also called visible light communication, which uses frequent flash of an LED light source to communicate. Presence of light represents 1, and absence of light represents 0, and a transmission rate in the visible light communication is up to 1000 Mbps per second. The wireless light communication performs data transmission by using visible light. Compared with a microwave technology, the wireless light communication has relatively rich spectrum resources, with which general microwave communication and wireless communication are incomparable. In addition, the visible light communication is compatible with any communication protocol and applicable to any environment. In terms of security, the visible light communication is free from theft of communication content. A wireless light communication device is flexible, portable, cost-efficient, and suitable for massive popularized application.

In the prior art, a mobile terminal such as a mobile phone performs visible light communication by controlling flashing of an LED flash. However, when controlling on and off states of the LED flash, delay occurs randomly, and on and off duration of the LED flash cannot be controlled precisely. Consequently, in an application of the mobile terminal such as a mobile phone, the LED flash works unstabitily when the LED flash is in a flashing state, which leads to errors in an optical signal transmission process.

With respect to receiving and decoding, a quantity of high levels denotes a signal in encoding currently. Duration of each high level is about 2 ms, and each group of levels includes at most four high levels. A quantity of levels in each group denotes a 2-bit signal. Because both a high level and a low level have a delay, a receive end may decode a received signal by detecting delays of a high level and a low level on an I/O pin of a single-chip microcomputer of the receive end.

A decoding method corresponding to the foregoing conventional encoding method needs to output and detect many high levels, which leads to signal instability. In addition, an overall sending time and an overall receiving time of a signal are long, and data transmission is slow.

SUMMARY OF THE INVENTION

According to a first aspect of this application, this application provides an optical signal encoding method, including the following steps:

reading N-ary data bit by bit, and encoding the data into electric signal units: encoding each different digit in the N-ary data into a different electric signal unit, where high level duration and low level duration in the electric signal unit are $Ti1, Ti2, \ldots,$ and $Tij$ respectively, i, j, and N are natural numbers, and the different electric signal units are separated by delimiters; and converting the encoded electric signal units into optical signals.

According to a second aspect of this application, this application provides an optical signal decoding method, including the following steps:

receiving an optical signal and converting the optical signal into an electric signal unit corresponding to brightness or darkness of the optical signal; and converting continuous electric signal units into N-ary data bit by bit:

when an electric signal unit is detected, detecting and recording high and low level duration in the electric signal unit: $Ti1, Ti2 \ldots,$ and $Tij$, where i, j, and N are natural numbers; and calculating an calculated value between $Ti2, Ti3 \ldots,$ and $Tij$ and $Ti1$, and according to the calculated value, converting the electric signal unit into a digit corresponding to the N-ary data.

According to a third aspect of this application, this application further provides an optical signal encoding device, including:

a first conversion unit, configured to read N-ary data bit by bit, and encode the data into electric signal units: encode each different digit in the N-ary data into a different electric signal unit, where high level duration and low level duration in the electric signal unit are $Ti1, Ti2, \ldots,$ and $Tij$ respectively, i, j, and N are natural numbers, and the different electric signal units are separated by delimiters; and a light emitting unit, configured to convert the encoded electric signal units into optical signals.

According to a fourth aspect of this application, this application further provides an optical signal decoding device, including:

a receiving unit, configured to receive an optical signal and convert the signal into an electric signal unit corresponding to brightness or darkness of the optical signal; and a conversion unit, configured to convert continuous electric signal units into N-ary data bit by bit:

when an electric signal unit is detected, detect and record high and low level duration in the electric signal unit: $Ti2, Ti2 \ldots,$ and $Tij$, where i, j, and N are natural numbers; and calculate a calculated value between $Ti2, Ti3 \ldots,$ and $Tij$ and $Ti1$, and according to the calculated value, convert the electric signal unit into a digit corresponding to the N-ary data.

According to a fifth aspect of this application, this application further provides an encoding-decoding system, including the optical signal encoding device and the decoding device for improving optical signal transmission reliability.

According to a sixth aspect of this application, this application further provides a photonic receive end, including a receiving device, configured to receive an optical signal and convert the optical signal into a current signal; a signal conversion device, configured to convert the current signal into a voltage signal; a denoising device, configured to filter the voltage signal and filter out noise interference signals; and an optical signal decoding device, where the receiving device, the signal conversion device, the denoising device, and the decoding device are successively connected in a communicational manner.

Beneficial effects of this application are as follows: According to the optical signal encoding and decoding methods and the device that are provided in this application, the following encoding steps are performed: converting to-be-sent data into corresponding N-ary data; reading N-ary data bit by bit, and encoding the data into electric signal units: encoding each different digit in the N-ary data into a different electric signal unit, where high level duration and low level duration in the electric signal unit are Ti1, Ti2, ..., and Tij respectively, i, j, and N are natural numbers, and the different electric signal units are separated by delimiters; and combining the electric signal units corresponding to the N-ary data into a drive signal, where the drive signal is used for being output in a light form. Because a terminal device such as a mobile phone automatically determines duration of transmitted levels, instable flashing of an LED flash of the mobile terminal such as a mobile phone is overcome effectively, and information transmission reliability is further improved. With respect to decoding, the decoding device decodes the encoded optical signal that is received by the receive end, which improves information transmission reliability, and the decoding device in this application leads to a low bit error rate of the receive end in restoring original data, which further improves stability of data transmission performance.

DESCRIPTION OF EMBODIMENTS

The following gives further detailed description on the present disclosure with reference to accompanying drawings and specific embodiments.

Embodiment 1

Although control precision of an LED flash of a mobile terminal such as a mobile phone is not high, a control delay of the flash is basically within a range. In addition, the mobile terminal such as a mobile phone itself can roughly read on and off duration of the LED flash. According to this characteristic, this embodiment proposes new encoding and decoding methods. Specifically, from a perspective of an optical signal, presence of light and absence of light are used to represent information instead of using change of states between light and absence of light to represent information. From a perspective of an electric signal, a level continuation state is used to represent information instead of using a level transition to represent information.

Figure 1:
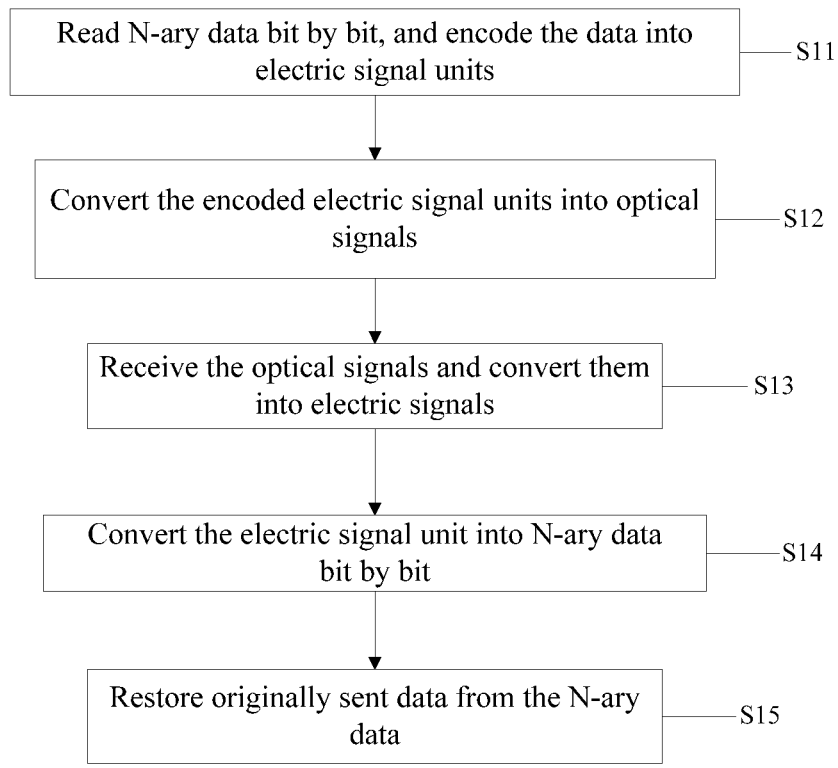
FIG. 1 is an encoding-decoding flowchart according to Embodiment 1.

Therefore, in encoding, an encoding flowchart is shown in FIG. 1. In this embodiment, stroboscopic visible light emitted by a flash of a mobile phone and stroboscopic visible light emitted by a photonic client can be encoded, and the encoding method includes the following steps.

S11. Read N-ary data bit by bit, and encode the data into electric signal units.

The N-ary data is converted into corresponding electric signal units bit by bit. This step includes: encoding each different digit in the N-ary data into a different electric signal unit, where high level duration and low level duration in the electric signal unit are Ti1, Ti2 ..., Tij respectively, and Tij, i, j, and N are natural numbers. Different electric signal units are separated by delimiters. As regards the high level and the low level in the electric signal unit in this embodiment, a high level does not come before a low level by default. Instead, a low level may come before a high level. A delimiter between a high level and a low level may be a level transition; or a high or a low level that continues for different duration is used as a characteristic level, and the delimiter between the high level and the low level is a reference level different from the characteristic level.

In an optional embodiment, at least a part of to-be-encoded N-ary data may be encoded into level signals that are in different states, the data is divided into multiple levels according to sizes of the level signals, and a different level denotes a different digit in the N-ary data.

In this step, the data read by the mobile terminal may be converted N-ary data or original data. If the original data is read, the original data needs to be converted into N-ary data before step S11. The mobile terminal may be a mobile phone, a tablet or the like that has an LED flash.

In this embodiment, an calculated value between Ti2, Ti3 ..., and Tij and Ti1 are predetermined values or in predetermined ranges, where the calculation refers to calculating a ratio, a product, a difference, a sum, a reciprocal, and/or a remainder after division between the Ti2, Ti3 ..., Tij and Ti1. Because digits of different N-ary data are encoded into different electric signal units, a different electric unit has a different calculated value. That is, a ratio, a product, a difference, a sum, a reciprocal, and/or a remainder after division between the Ti2, Ti3 ..., and Tij and Ti1 are unequal to a ratio, a product, a difference, a sum, a reciprocal, and/or a remainder between Ti–12, Ti–13 ..., Ti–1j and Ti–11 respectively.

In this step, using the binary data as an example, when N=2, the binary data 0 is encoded into a first electric signal unit, and high level duration and low level duration in the first electric signal unit are T11 and T12 respectively; the binary data 1 is encoded into a second electric signal unit, and high level duration and low level duration in the second electric signal unit are T21 and T22 respectively. The duration T11 is a preset time, T12=T11, T21=T11, T22=m*T21, and m is a specified coefficient; or T11 duration is a preset time range, T12, T11, and T21 are in the same time range, T122=m*21, and m is a specified coefficient, which finally makes the calculated value between T22 and T21 be unequal to the operation value between T12 and T11.

The level transition is a transition from a high level to a low level. In binary data, a level transition occurs in an electric signal unit, in which the high level controls the LED flash to emit light, and the low level controls the LED flash not to emit light; in other embodiments, a reverse control manner may be applied, for example, a level transition from the low level to the high level occurs, in which the low level controls the LED flash to emit light, and the high level controls the LED flash not to emit light.

S12. Convert the encoded electric signal units into optical signals.

A drive signal is used to modulate the LED flash of the mobile terminal, and the encoded electric signal unit is converted into an optical signal and then sent in a light form.

Further, this embodiment also provides a decoding method corresponding to the encoding method. A flowchart of the decoding method is shown in FIG. 1, and the decoding method includes the following steps.

S13. Receive the optical signals and convert them into electric signals.

That is, the received optical signal is converted into electric signal units corresponding to brightness or darkness of the optical signal.

S14. Convert continuous electric signal units in step S13 into N-ary data bit by bit.

Figure 2:
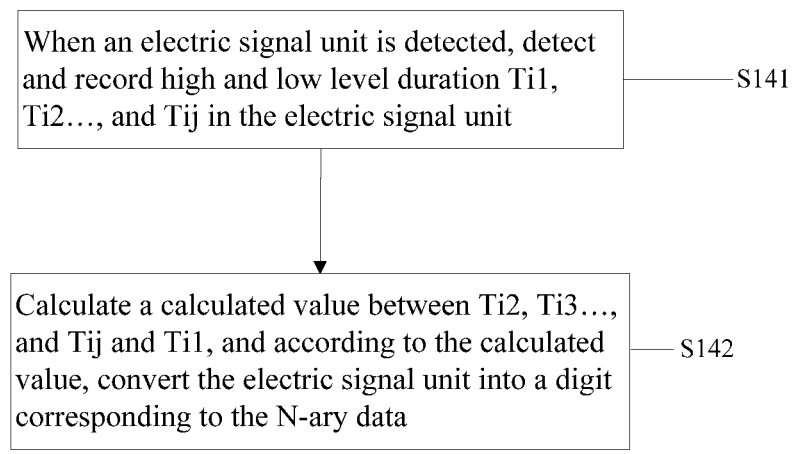
FIG. 2 is a flowchart of converting an electric signal unit into N-ary data in decoding according to Embodiment 1.

This step specifically includes S141~S142, and its flowchart is shown in FIG. 2: S141. When an electric signal unit is detected, detect and record high and low level duration in the electric signal unit: Ti1, Ti2 . . . , and Tij, where i, j, and N are natural numbers.

S142. Calculate an calculated value between Ti2, Ti3 . . . , and Tij and Ti1, and according to the operation value, convert the electric signal unit into a digit corresponding to the N-ary data.

Corresponding to the encoding method, in this step, a calculated value between Ti2, Ti3 . . . , and Tij and Ti1 are predetermined values or in predetermined ranges, where the calculation refers to calculating a ratio, a product, a difference, a sum, a reciprocal, and/or a remainder after division between the Ti2, Ti3 . . . , and Tij and Ti1. Because digits of different N-ary data are encoded into different electric signal units in the encoding method, a different electric unit has a different calculated value. That is, a ratio, a product, a difference, a sum, a reciprocal, and/or a remainder after division between the Ti2, Ti3 . . . , and Tij and Ti1 is unequal to a ratio, a product, a difference, a sum, a reciprocal, and/or a remainder after division between Ti−12, Ti−13 . . . , Ti−1j and Ti−11. According to different calculated values, different electric signal units are converted into digits corresponding to the N-ary data.

For example, binary data is used as an example in this step. When N=2, high and low level duration T21 and T22 in the electric signal unit are detected and recorded, an calculated value between T22 and T21 is calculated, and binary data 1 or 0 represented by the electric signal unit is determined according to the calculated value. The following uses a ratio calculation as an example, and other operations are similar and not detailed herein any further:

when (T22/T21)≈1, binary data represented by the electric signal unit is 0; and when (T22/T21)≈m, and m≠1, binary data represented by the electric signal unit is 1, where m is a specified coefficient.

S15. Restore originally sent data from the N-ary data.

Figure 3:
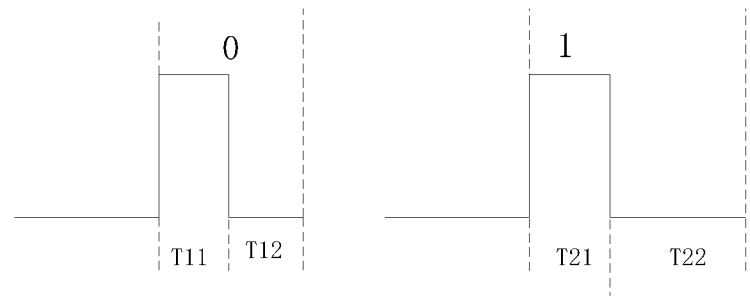
FIG. 3 is a waveform diagram of electric signal units that represent N-ary data 0 and 1 in encoding according to Embodiment 1.
Figure 4:
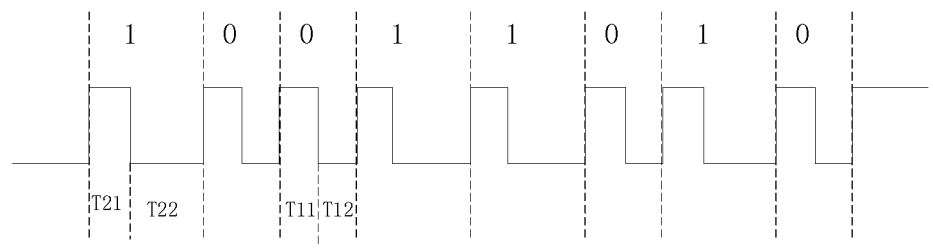
FIG. 4 is a waveform diagram of electric signals of encoded information according to Embodiment 1.

The N-ary data may be binary data, octal data or hexadecimal data or the like. In this embodiment, binary data is used as an example. For example, to-be-sent data is converted into binary data 10011010, preset duration T11 is 5 ms, T12=T11, T21=T11, and T22=2*T21. The binary data 10011010 is encoded according to the foregoing encoding method, and the encoding manner corresponding to 0 or 1 is: when read information is 1, the information is converted into an electric signal unit, and duration of a high level in the electric signal unit is 5 ms, and then the level transitions from the high level to a low level, duration of the low level is 10 ms, and a waveform of the electric signal unit is shown in FIG. 3; when read information is 0, the information is converted into an electric signal unit, and duration of a high level in the electric signal unit is 5 ms, and then the level transitions from the high level to a low level, duration of the low level is 5 ms, and a waveform of the electric signal unit is shown in FIG. 3. This process goes on by analogy. Then all electric signal units are combined, and the electric signal units are separated by delimiters, and the delimiters are level transitions. Finally, the binary data is an electric signal corresponding to 10011010, as shown in FIG. 4. The electric signal controls the LED flash of the mobile terminal to flash, and the encoded information is sent in the form of visible light.

The electric signal in FIG. 4 is decoded by using the decoding method: when an electric signal unit is detected, high and low level duration T21 and T22 in the electric signal unit are detected and recorded. When it is detected that the duration T21 of a first level is 5 ms and the duration T22 of a second level is 10 ms, calculation is performed to learn T22/T21=2, and therefore, the electric signal unit represents binary data 1. If the duration T21 of the first level is 5 ms and the duration T22 of the second level is also 5 ms, T22/T21=1 and the electric signal unit represents binary data 0. This calculation goes on by analogy, and finally, the electric signal in FIG. 4 is converted into binary data, and originally sent data is restored.

In another optional embodiment, it may be preset that a time range T11 is 4 ms~6 ms, T12=T11, T21=T11, and T22=2*T21. The binary data 10011010 is encoded according to step S11, and the encoding manner corresponding to 0 or 1 is: when information 1 is read, the information is converted into an electric signal unit, which is specifically: a continuation time range of a high level in the electric signal unit is 4 ms~6 ms, and then the level transitions from the high level to a low level, a continuation time range of the low level is 8 ms~12 ms; when information 0 is read, the information is converted into an electric signal unit, which is specifically: a continuation time range of a high level in the electric signal unit is 4 ms~6 ms, and then the level transitions from the high level to a low level, a continuation time range of the low level is 4 ms~6 ms. This process goes on by analogy. Then all electric signal units are combined, and the electric signal units are separated by delimiters, and the delimiters are level transitions. Finally, the binary data is an electric signal corresponding to 10011010. The electric signal controls the LED flash of the mobile terminal to flash, and the encoded information is sent in the form of visible light.

Further, decoding is performed according to a preset time range and as shown in FIG. 4: when an electric signal unit is detected, high and low level duration T21 and T22 in the electric signal unit are detected and recorded. When it is detected that the continuation time range T21 of a first level is 4 ms~6 ms and the continuation time range T22 of a second level is 8 ms~12 ms, calculation is performed to learn that T22+T21 is the first preset time range 12 ms~18 ms. Therefore, the electric signal unit represents binary data 1. If the continuation time range T21 of a first level is 4 ms~6 ms and the continuation time range T22 of a second level is also 4 ms~6 ms, T22+T21 is the second preset time range 8 ms~12 ms. Therefore, the electric signal unit represents binary data 0. This calculation goes on by analogy, and finally, the electric signal is converted into binary data, and originally sent data is restored.

Figure 5:
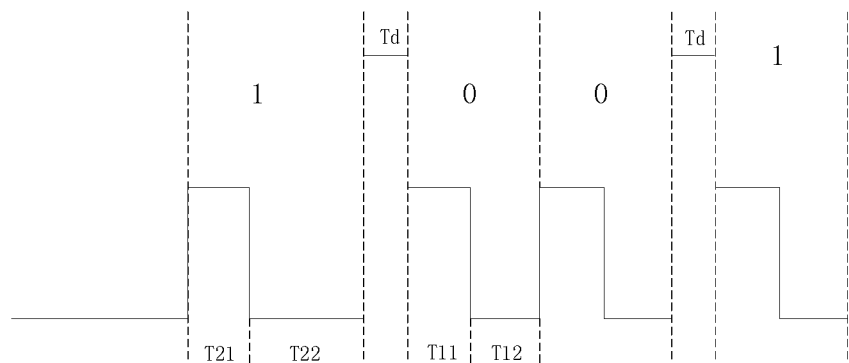
FIG. 5 is a waveform diagram of electric signals of encoded information when a delimiter is a reference level according to Embodiment 1.

In another optional embodiment, all electric signal units may be separated by using a reference level as a delimiter. According to actual conditions, a reference level different from the characteristic level is selected. In this embodiment, a double high level with double voltage of the high level is used as a reference level. In other embodiments, a level with other times of the high level may be used as a reference level. Binary data is used as an example. For example, a to-be-sent data is converted into binary data 1001. The binary data 1001 is encoded according to the foregoing method. Different electric signal units are separated by using a double high level as a delimiter, and the duration Td of the double high level is less than high and low level duration in each electric signal unit. Finally the binary data is the electric signal corresponding to 1001, as shown in FIG. 5.

The characteristic level refers to the recorded high or low level in the electric signal unit.

Embodiment 2

Based on the encoding method in Embodiment 1, this embodiment provides another calculation relationship of high and low level duration Ti1, Ti2 . . . , Tij in different electric signal units. Specifically, the calculation relationship is a difference operation between Ti2, Ti3 . . . , and Tij and Ti1. Specifically, binary data is used as an example. Binary data 0 is encoded into a first electric signal unit, and high level duration and low level duration in the first electric signal unit are T11 and T12 respectively. Binary data 1 is encoded into a second electric signal unit, and high level duration and low level duration in the second electric signal unit are T21 and T22 respectively. In this embodiment, a relationship between T12 and T11 and a relationship between T22 and T21 are: A difference between T12 and T11 is less than or equal to a third predetermined value (|T12−T11|≤T0), and a calculation value between T22 and T21 is greater than a third predetermined value (|T22−T21|>T0), where the third predetermined value is preset decision duration T0. The setting of T0 needs to consider at least two factors: encoding accuracy and encoding efficiency. If T0 is too short, |T02−T01| is hardly differentiated from |T12−T11|, which reduces encoding accuracy. If T0 is too long, encoding efficiency is reduced. Therefore, the setting of T0 needs to strike a balance between the two factors, and preferably, T0<1 second.

Therefore, in the corresponding decoding method, a difference between the duration T22 of the second level and the duration T21 of the first level needs to be calculated, and an absolute value of the difference is compared with the third predetermined value T0. According to a result of the comparing, it is determined that the binary data represented by the electric signal unit is 0 or 1. A specific determining manner is as follows:

when |T22−T21|≤T0, binary data represented by the electric signal unit is 0; and when |T22−T21|>T0, binary data represented by the electric signal unit is 1.

In an optional embodiment, the following reverse control manner may be applied, for example, a relationship between T12 and T11 and a relationship between T22 and T21 are: A sum of T12 and T11 is less than or equal to a third predetermined value (|T12+T11|>T0), and a sum of T22 and T21 is greater than a third predetermined value (|T22+T21|≤T0), where the third predetermined value is preset decision duration T0.

Therefore, in the corresponding decoding method, a sum of the duration T22 of the second level and the duration T21 of the first level needs to be calculated, and the sum is compared with the third predetermined value T0. According to a result of the comparing, it is determined that the binary data represented by the electric signal unit is 0 or 1. A specific determining manner is as follows:

when (T22+T21)≤T0, binary data represented by the electric signal unit is 0; and when (T22+T21)>T0, binary data represented by the electric signal unit is 1.

In another optional embodiment, a product of T12 and T11 is less than or equal to a third predetermined value (|T12*T11|>T0), and a product of T22 and T21 is greater than a third predetermined value (|T22*T21|≤T0), where the third predetermined value is preset decision duration T0.

Therefore, in the corresponding decoding method, a product of the duration T22 of the second level and the duration T21 of the first level needs to be calculated, and the product is compared with the third predetermined value T0. According to a result of the comparing, it is determined that the binary data represented by the electric signal unit is 0 or 1. A specific determining manner is as follows:

when (T22*T21)≤T0, binary data represented by the electric signal unit is 0; and when (T22*T21)>T0, binary data represented by the electric signal unit is 1.

In the foregoing technical solution, because the switching of an LED flash of a mobile terminal such as a mobile phone is controllable and the on or off duration is controllable, and because the mobile terminal such as a mobile phone itself can roughly read the on or off duration of the LED flash, differences between the on duration and the off duration of the LED are set to represent data. When the mobile terminal such as a mobile phone obtains to-be-sent data, the information is encoded in an encoding manner provided in this embodiment, and then the encoded information is sent in the form of visible light by using the LED flash. The receive end receives the visible light signal, converts the optical signal into an electric signal by using an optical-to-electric conversion device, and detects high level duration and low level duration in the electric signal unit, and then decodes the obtained signal to restore original data by using calculation values. According to this embodiment, instable flashing of the LED flash of the mobile terminal such as a mobile phone is overcome effectively, communication can be implemented between the mobile terminal such as a mobile phone and a visible light signal receive end, and optical signal transmission stability between them is improved.

Embodiment 3

Figure 6:
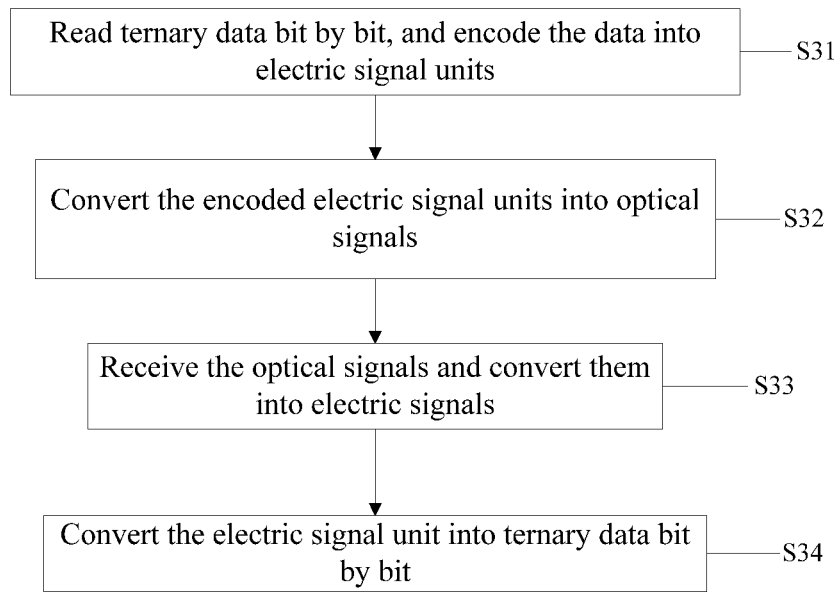
FIG. 6 is a ternary data encoding-decoding flowchart according to Embodiment 3.

Based on Embodiment 1 and Embodiment 2, this embodiment further uses N=3 as an example to describe an encoding and decoding method provided in the present disclosure. A flowchart of the method is shown in FIG. 6, and the method includes the following detailed steps.

S31. Read ternary data bit by bit, and encode the data into electric signal units.

The ternary data is converted into corresponding electric signal units bit by bit. This step includes: encoding each different digit in the ternary data into a different electric signal unit, where different electric signal units are separated by delimiters. As regards the high level and the low level in the electric signal unit in this embodiment, a high level does not come before a low level by default. Instead, a low level may come before a high level. A delimiter between a high level and low level may be a level transition; or high or low level that continues for different duration is used as a characteristic level, and the delimiter between the high level and the low level is a reference level different from the characteristic level.

Specifically, ternary data 0 is encoded into a first electric signal unit, and high level duration and low level duration in the first electric signal unit are T11 and T12 respectively. Ternary data 1 is encoded into a second electric signal unit, and high level duration and low level duration in the second electric signal unit are T21, T22, and T23 respectively. Ternary data 2 is encoded into a third electric signal unit, and high level duration and low level duration in the third electric signal unit are T31, T32, T33, and T34 respectively. Duration T11 is a preset time, T11=2 ms, T12=T11, T21=T11, T22=2*T21, T23=3*T21, T31=T11, T32=2*T31, T33=3*T31, and T34=4*T31. In other embodiments, T11, T21, and T31 may be set to different preset duration, or set to different preset time ranges.

S32. Convert the encoded electric signal units into optical signals.

S33. Receive the optical signals and convert them into electric signals.

S34. Convert continuous electric signal units in step S33 into ternary data bit by bit.

When an electric signal unit is detected, the high and low level duration T31, T32 . . . , T3j in the electric signal unit are detected and recorded, and a calculated value between T32, . . . , and T3j and T31 is calculated. According to an calculated value, the electric signal unit is converted into a digit corresponding to the ternary data, where the calculation refers to calculating a ratio, a product, a difference, a sum, a reciprocal, and/or a remainder after division between T32, . . . , and T3j and T31. In this embodiment, a ratio calculation is used as an example. For other calculation, reference can be made to 2.

Specifically, when completion of an electric signal unit is detected, if the duration T31 of the first level in the electric signal unit is 2 ms and the duration T32 of the second level is 2 ms, calculation may be performed to learn T32/T31=1, and therefore, the electric signal unit represents ternary data 0. If the duration T31 of the first level in the electric signal unit is 2 ms, the duration T32 of the second level is 4 ms, and the duration T33 of the third level is 6 ms, calculation may be performed to learn T32/T31=2 and T33/T31=3, and therefore, the electric signal unit represents ternary data 1. If the duration T31 of the first level in the electric signal unit is 2 ms, the duration T32 of the second level is 4 ms, the duration T33 of the third level is 6 ms, and the duration T34 of the fourth level is 8 ms, calculation may be performed to learn T32/T31=2, T33/T31=3, and T34/T31=4, and therefore, the electric signal unit represents ternary data 2.

Embodiment 4

Based on Embodiment 1 and Embodiment 2, this embodiment provides an encoding device for improving optical signal transmission reliability, including:

a first conversion unit, configured to read N-ary data bit by bit, and encode the data into electric signal units: encode each different digit in the N-ary data into a different electric signal unit, where high level duration and low level duration in the electric signal unit are Ti1, Ti2, . . . , Tij respectively, i, j, and N are natural numbers, and the different electric signal units are separated by delimiters; and a light emitting unit, configured to convert the encoded electric signal units into optical signals.

The light emitting unit may combine the electric signal units corresponding to the N-ary data into a drive signal, where the drive signal is used for being output in a light form.

In this embodiment, a method used by the first conversion unit of the encoding device to encode the N-ary data into an electric signal unit is similar to the encoding method described in Embodiment 1 and Embodiment 2, and is not detailed herein any further. For details, reference can be made to the encoding method in Embodiment 1 and Embodiment 2.

Figure 11:
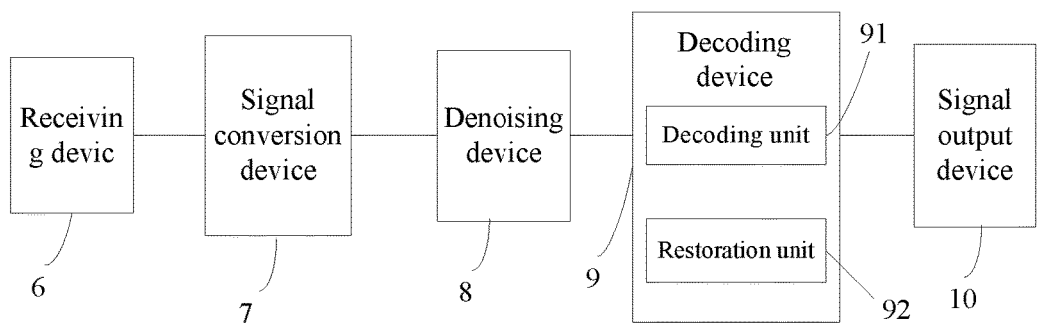
FIG. 11 is a schematic diagram of a photonic receive end according to Embodiment 4.

Further, this embodiment provides a photonic receive end. As shown in FIG. 11, the photonic receive end includes a receiving device 6, a signal conversion device 7, a denoising device 8, a decoding device 9, and a signal output device 10. The receiving device 6, the signal conversion device 7, the denoising device 8, the decoding device 9, and the signal output device 10 are successively connected in a communicational manner.

The receiving device 6 is configured to receive an optical signal sent by a photonic client, and convert the optical signal into a current signal. The signal conversion device 7 is configured to convert the current signal into a voltage signal. The denoising device 8 is configured to filter the voltage signal to filter out noise interference signals. Because other light around the emitted visible light, such as light from a fluorescent lamp, may generate noise in a visible light communication process, the denoising device 8 may analyze and denoise the voltage signal in such ways as median filtering and wavelet transforming. The decoding device 9 is configured to decode the denoised voltage signal to obtain original data sent by the photonic client. The signal output device 10 is configured to send the original data restored by the decoding device 9 to a background working system. The background working system performs a corresponding operation on the original data. For example, in a bank transaction system, the background working system is a transaction platform of a POS machine. The POS machine performs a transaction according to data information sent by the signal output device 10. In an authentication system, the background working system is an authentication platform, and the authentication platform performs rights authentication according to data information sent by the signal output device 10.

The decoding device includes:

a receiving unit, configured to receive an optical signal and convert the signal into an electric signal unit corresponding to brightness or darkness of the optical signal; and a conversion unit, configured to convert electric signal units into N-ary data bit by bit:

when an electric signal unit is detected, detect and record high and low level duration in the electric signal unit: Ti1, Ti2 . . . , and Tij, where i, j, and N are natural numbers; and calculate a calculated value between Ti2, Ti3 . . . , and Tij and Ti1, and according to the calculated value, convert the electric signal unit into a digit corresponding to the N-ary data; and a restoration unit, configured to restore originally sent data from the N-ary data.

The decoding unit 91 of the decoding device 9 decodes the obtained electric signal unit by detecting the duration of the high level and the low level in the electric signal unit and then by using the calculated value; and the restoration unit 92 restores the original data from the decoded data, thereby improving reliability of information transmission between the photonic receive end and the photonic client. In addition, by using the decoding device 9 in this application, the bit error rate of the photonic receive end in restoring the original data is relatively low, which further improves data transmission performance stability.

Corresponding to the encoding mode used by the encoding device, a method used by the conversion unit of the decoding device in this embodiment to decode the electric signal unit into N-ary data is similar to the decoding method described in Embodiment 1 and Embodiment 2, and is not detailed herein any further. For details, reference can be made to the decoding method in Embodiment 1 and Embodiment 2.

This embodiment further provides an encoding-decoding system, which includes the encoding device and the decoding device. The encoding-decoding system is applicable to an authentication system such as an access control system, a subway system, a payment system, or a consumption management system. The authentication system is well-known to a person skilled in the art, and is not detailed herein any further. The authentication system includes a transmit end and a receive end. The transmit end includes the encoding device, and the receive end includes the decoding device. Using an access control system as an example, a photonic key is used as a transmit end, and encoded identification data is sent in the form of a visible light signal by using an LED lamp of an electronic key. A photonic controlled end is used as a receive end to receive the visible light signal for decoding, and then according to the decoding, the identification data is obtained for authentication.

Embodiment 5

Figure 7:
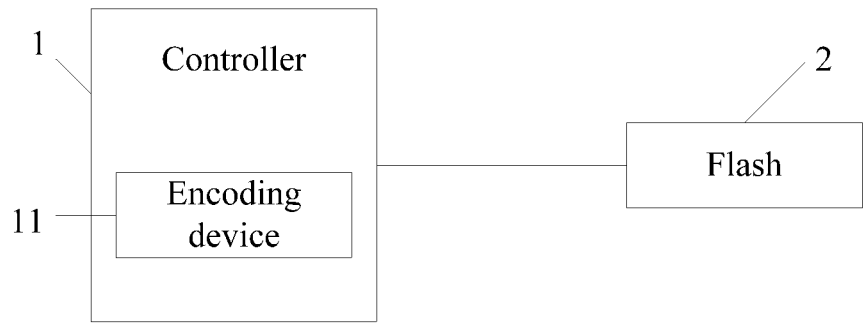
FIG. 7 is a schematic diagram of controlling a flash according to Embodiment 5.

Based on the encoding device for improving optical signal transmission reliability that is provided in Embodiment 3, this embodiment applies the encoding device in Embodiment 3 to flash control. Specifically, the encoding device encodes a control parameter of a flash into a drive signal, and controls the flash to emit light by using the drive signal. FIG. 7 shows a schematic diagram of control.

A controller 1 includes an encoding device 11. The encoding device 11 in this embodiment is similar to the encoding device in Embodiment 3, and is not detailed herein any further. For details, reference can be made to Embodiment 3. The encoding mode of the encoding device 11 is the encoding mode in Embodiment 1. For a detailed encoding mode, reference can be made to Embodiment 1, and the encoding mode is not described in detail herein any further.

If the on or off control parameter of a flash 2 is used as to-be-sent data, the encoding device 11 converts the on or off control parameter into a drive signal in the encoding mode used in Embodiment 1. The drive signal controls the flash 2 to emit visible light. The controller 1 in this embodiment is an MCU, and the flash 2 in this embodiment is an LED.

Embodiment 6

Figure 8:
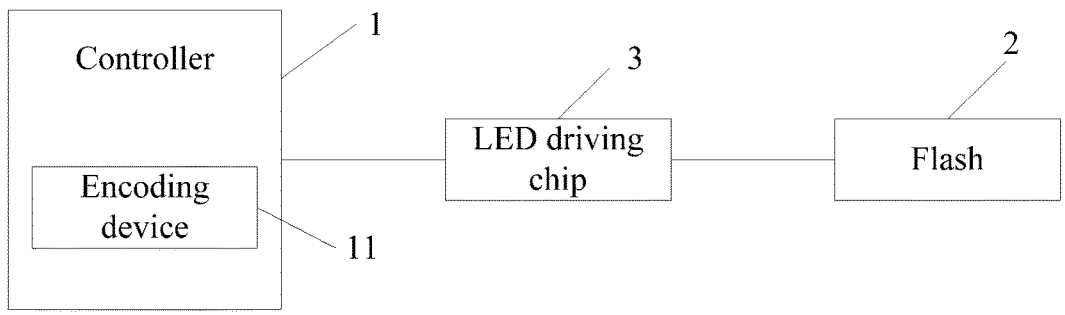
FIG. 8 is a schematic diagram of controlling a flash according to Embodiment 6.

Based on the encoding device for improving visible light signal transmission reliability that is provided in Embodiment 3, this embodiment applies the encoding device in Embodiment 3 to flash control. Specifically, the encoding device encodes a control parameter of a flash into a drive signal, an LED driving chip obtains the drive signal and converts the drive signal into a control signal, and the control signal controls the flash to emit light. FIG. 8 shows a schematic diagram of control.

A controller 1 in this embodiment includes an encoding device 11. The encoding device 11 in this embodiment is similar to the encoding device in Embodiment 3, and is not detailed herein any further. For details, reference can be made to Embodiment 3. The encoding mode of the encoding device 11 is the encoding mode in Embodiment 1. For a detailed encoding mode, reference can be made to Embodiment 1, and the encoding mode is not described in detail herein any further.

If the on or off control parameter of a flash 2 is used as to-be-sent data, the encoding device 11 encodes the on or off control parameter into a drive signal in the encoding mode used in Embodiment 1. The LED driving chip 3 obtains the drive signal, and converts the drive signal into a control signal. The control signal controls the flash 2 to emit visible light. The flash 2 in this embodiment is an LED.

Embodiment 7

Figure 9:
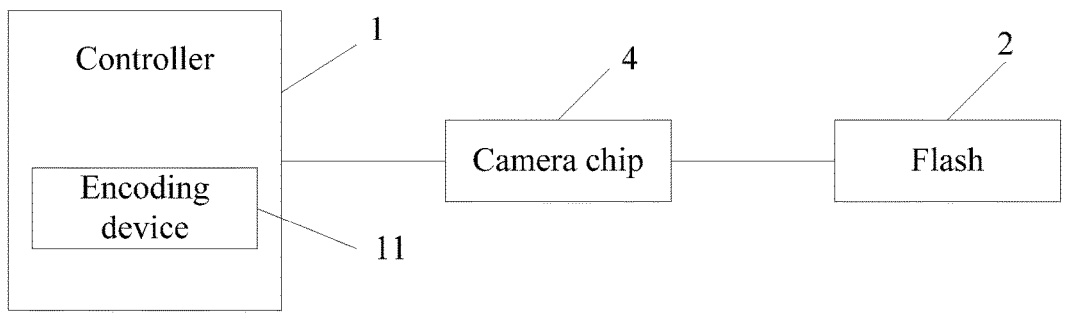
FIG. 9 is a schematic diagram of controlling a flash according to Embodiment 7.

Based on the encoding device for improving visible light signal transmission reliability that is provided in Embodiment 3, this embodiment applies the encoding device in Embodiment 3 to flash control. Specifically, the encoding device encodes a control parameter of a flash into a drive signal, a camera chip obtains the drive signal and converts the drive signal into a control signal, and the control signal controls the flash to emit light. FIG. 9 shows a schematic diagram of control.

A controller 1 in this embodiment includes an encoding device 11. The encoding device 11 in this embodiment is similar to the encoding device in Embodiment 3, and is not detailed herein any further. For details, reference can be made to Embodiment 3. The encoding mode of the encoding device 11 is the encoding mode in Embodiment 1. For a detailed encoding mode, reference can be made to Embodiment 1, and the encoding mode is not described in detail herein any further.

If the on or off control parameter of a flash 2 is used as to-be-sent data, the encoding device 11 converts the on or off control parameter into a drive signal in the encoding mode used in Embodiment 1. The camera chip 4 obtains the drive signal, and converts the drive signal into a control signal. The control signal controls the flash 2 to emit visible light. The flash 2 in this embodiment is an LED.

Embodiment 8

Figure 10:
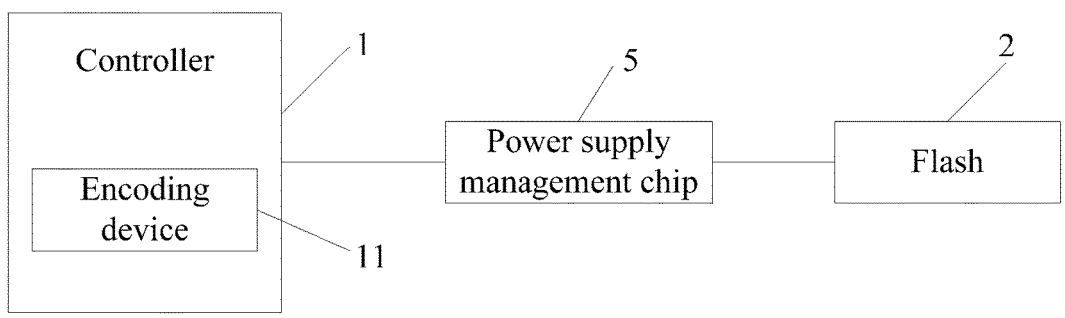
FIG. 10 is a schematic diagram of controlling a flash according to Embodiment 8.

Based on the encoding device for improving visible light signal transmission reliability that is provided in Embodiment 3, this embodiment applies the encoding device in Embodiment 3 to flash control. Specifically, the encoding device encodes a control parameter of a flash into a drive signal, a power supply management chip obtains the drive signal and converts the drive signal into a control signal, and the control signal controls the flash to emit light. FIG. 10 shows a schematic diagram of control.

A controller 1 in this embodiment includes an encoding device 11. The encoding device 11 in this embodiment is similar to the encoding device in Embodiment 3, and is not detailed herein any further. For details, reference can be made to Embodiment 3. The encoding mode of the encoding device 11 is the encoding mode in Embodiment 1. For a detailed encoding mode, reference can be made to Embodiment 1, and the encoding mode is not described in detail herein any further.

If the on or off control parameter of a flash 2 is used as to-be-sent data, the encoding device 11 converts the on or off control parameter into a drive signal in the encoding mode used in Embodiment 1. The power supply management chip 5 obtains the drive signal, and converts the drive signal into a control signal. The control signal controls the flash 2 to emit visible light. The flash 2 in this embodiment is an LED.

The foregoing content is detailed description that is made about the present disclosure with reference to specific implementation manners, but specific implementation of the present disclosure shall not be limited to such description. A person of ordinary skill in the art may simply obtain derivatives or replacements without departing from the conception of the present disclosure.

INDUSTRIAL APPLICABILITY

According to the technical solution provided in the present disclosure, a terminal device such as a mobile phone automatically determines duration of transmitted levels, instable flashing of an LED flash of the mobile terminal such as a mobile phone is overcome effectively, and information transmission reliability is further improved. This solution is industrially producible and manufacturable, and is industrially applicable.

What is claimed is:

1. An optical signal encoding and decoding method, comprising the following steps:
    reading N-ary data bit by bit, and encoding the data into electric signal units: encoding each different digit in the N-ary data into a different electric signal unit, wherein high level duration and low level duration in the electric signal unit are Ti1, Ti2, . . . , and Tij respectively, i, j, and N are natural numbers, and the different electric signal units are separated by delimiters; and
    converting the encoded electric signal units into optical signals;
    receiving the optical signals and converting the optical signals into an electric signal unit corresponding to brightness or darkness of the optical signals; and
    converting the electric signal unit into N-ary data bit by bit;
    when an electric signal unit is detected, detecting and recording high and low level duration in the electric signal unit: Ti1, Ti2 . . . , and Tij, and
    calculating an calculated value between Ti2, Ti3 . . . , and Tij and Ti1, and according to the calculated value, converting the electric signal unit into a digit corresponding to the N-ary data;
    wherein the calculated values between Ti2, Ti3, . . . , and Tij and Ti1 are predetermined values or in predetermined ranges, and i, j, and N are natural numbers;
    wherein the delimiters are level transitions; or, high and low levels with different duration are characteristic levels, and the delimiters are reference levels different from the characteristic levels.

2. The optical signal encoding and decoding method according to claim 1, wherein when N=2, encode 0 into a first electric signal unit, and high level duration and low level duration in the first electric signal unit are T11 and T12 respectively; and 1 is encode 1 into a second electric signal unit, and high level duration and low level duration in the second electric signal unit are T21 and T22 respectively; and
    a calculated value between T22 and T21 is unequal to a calculated value between T12 and T11.

3. The optical signal encoding and decoding method according to claim 1, wherein a calculated value of a ratio, a product, a difference, a sum, a reciprocal, and/or a remainder after division between Ti2, Ti3, . . . , and Tij and Ti1 are predetermined values or in predetermined ranges.

4. The optical signal encoding and decoding method according to claim 1, wherein at least a part of to-be-encoded N-ary data is encoded into level signals that are in different states.

5. The optical signal decoding and decoding method according to claim 1, wherein when N=2, detect and record high and low level duration T21 and T22 in the electric signal unit, calculate a calculated value between T22 and T21, and determine binary data 1 or 0 represented by the electric signal unit according to the operation value.

6. The optical signal encoding and decoding method according to claim 2, wherein T11 duration is a preset time period, T12=T11, T21=T11, T22=m*T21, and m is a specified coefficient; or T11 duration is a preset time range, T12, T11, and T21 are in the same time range, T22=m*T21, and m is a specified coefficient.

7. The optical signal encoding and decoding method according to claim 3, wherein the calculated value of a ratio, a product, a difference, a sum, a reciprocal, and/or a remainder after division between Ti2, Ti3, . . . , and Tij and Ti1 is unequal to a calculated value of a ratio, a product, a difference, a sum, a reciprocal, and/or a remainder after division between Ti−12, Ti−13 . . . , and Ti−1j and Ti−11.

8. The optical signal encoding and decoding method according to claim 4, wherein the data is divided into multiple levels according to sizes of the level signals, and a different level denotes a different digit in the N-ary data.

9. The optical signal decoding and decoding method according to claim 5, wherein
    when (T22/T21)≈1, binary data represented by the electric signal unit is 0; and
    when (T22/T21)≈m, and m≠1, binary data represented by the electric signal unit is 1, wherein m is a specified coefficient.

10. An optical signal encoding device, comprising:
    a first conversion unit, configured to read N-ary data bit by bit, and convert the data into electric signal units:
    encoding each different digit in the N-ary data into a different electric signal unit, wherein high level duration and low level duration in the electric signal unit are Ti1, Ti2, . . . , and Tij respectively, i, j, and N are natural numbers, and the different electric signal units are separated by delimiters; wherein an calculated value between Ti2, Ti3, . . . , and Tij and Ti1 are predetermined values or in predetermined ranges; and
    a light emitting unit, configured to convert the encoded electric signal units into optical signals;
    wherein the delimiters are level transitions; or, high and low levels with different duration are characteristic levels, and the delimiters are reference levels different from the characteristic levels.

11. The optical signal encoding device according to claim 10, wherein when N=2, the second conversion unit converts 0 into a first electric signal unit, wherein high level duration and low level duration in the first electric signal unit are T11 and T12 respectively; and the second conversion unit converts 1 into a second electric signal unit, wherein high level duration and low level duration in the second electric signal unit are T21 and T22 respectively; and
an calculated value between T22 and T21 is unequal to an calculated value between T12 and T11.

12. The optical signal encoding device according to claim 10, wherein an calculated value of a ratio, a product, a difference, a sum, a reciprocal, and/or a remainder after division between Ti2, Ti3, . . . , Tij and Ti1 is a predetermined value or in predetermined ranges.

13. The optical signal encoding device according to claim 12, wherein the calculated value of a ratio, a product, a difference, a sum, a reciprocal, and/or a remainder after division between Ti2, Ti3, . . . , Tij and Ti1 is unequal to an calculated value of a ratio, a product, a difference, a sum, a reciprocal, and/or a remainder after division between Ti−12, Ti−13 . . . , Ti−1j and Ti−11.

14. An optical signal decoding device, comprising:
a receiving unit, configured to receive a visible light signal and convert the signal into electric signal units corresponding to brightness or darkness of the optical signal, wherein the different electric signal units are separated by delimiters, the delimiters are level transitions; or, high and low levels with different duration are characteristic levels, and the delimiters are reference levels different from the characteristic levels; and
a conversion unit, configured to convert continuous electric signal units into N-ary data bit by bit:
when an electric signal unit is detected, detect and record high and low level duration in the electric signal unit: Ti1, Ti2 . . . , and Tij, wherein i, j, and N are natural numbers; and calculate an calculated value between Ti2, Ti3 . . . , and Tij and Ti1, and according to the calculated value, convert the electric signal unit into a digit corresponding to the N-ary data, wherein an calculated value between Ti2, Ti3, . . . , and Tij and Ti1 are predetermined values or in predetermined ranges.

15. The optical signal decoding device according to claim 14, wherein when N=2, high and low level duration T21 and T22 in the electric signal unit are detected and recorded, an calculated value between T22 and T21 is calculated, and binary data 1 or 0 represented by the electric signal unit is determined according to the operation value.

16. The optical signal decoding device according to claim 14, wherein a calculated value of a ratio, a product, a difference, a sum, a reciprocal, and/or a remainder after division between Ti2, Ti3, . . . , and Tij and Ti1 is predetermined values or in predetermined ranges.

17. The optical signal decoding device according to claim 16, wherein the calculated value of a ratio, a product, a difference, a sum, a reciprocal, and/or a remainder after division between Ti2, Ti3, . . . , and Tij and Ti1 is unequal to a calculated value of a ratio, a product, a difference, a sum, a reciprocal, and/or a remainder after division between Ti−12, Ti−13 . . . , and Ti−1j and Ti−11.

18. The optical signal decoding device according to claim 15, wherein
when (T22/T21)≈1, binary data represented by the electric signal unit is 0; and
when (T22/T21)≈m, and m≠1, binary data represented by the electric signal unit is 1, wherein m is a specified coefficient.

* * * * *